United States Patent
Murphy et al.

(10) Patent No.: US 7,634,387 B2
(45) Date of Patent: Dec. 15, 2009

(54) FREQUENCY ENVELOPE DETECTION METHOD FOR SIGNAL ANALYSIS

(75) Inventors: Cary R. Murphy, Hickory, NC (US);
Daniel M. Goertzen, Conover, NC (US);
Mark K. Bridges, Hickory, NC (US);
David E. Vokey, Sidney (CA)

(73) Assignee: Network Integrity Systems, Hickory, NC (US)

( * ) Notice: Subject to any disclaimer, the term of this patent is extended or adjusted under 35 U.S.C. 154(b) by 535 days.

(21) Appl. No.: 11/461,902

(22) Filed: Aug. 2, 2006

(65) Prior Publication Data

US 2007/0077064 A1    Apr. 5, 2007

Related U.S. Application Data

(60) Provisional application No. 60/704,914, filed on Aug. 3, 2005.

(51) Int. Cl.
*G06F 11/30* (2006.01)
(52) U.S. Cl. ...................................................... 702/183
(58) Field of Classification Search ............. 702/57–59, 702/65–67, 71, 75–77, 85, 106, 182–185, 702/188, 189, 193; 370/210, 235.1, 242
See application file for complete search history.

(56) References Cited

U.S. PATENT DOCUMENTS

| | | | | |
|---|---|---|---|---|
| 3,838,408 A | * | 9/1974 | McMaster | 340/501 |
| 4,433,328 A | * | 2/1984 | Saphir et al. | 340/555 |
| 6,215,408 B1 | * | 4/2001 | Leonard et al. | 340/644 |
| 7,230,711 B1 | * | 6/2007 | Hovde | 356/432 |

* cited by examiner

*Primary Examiner*—Mohamed Charioui
(74) *Attorney, Agent, or Firm*—Adrian D. Battison; Ade & Company Inc.

(57) ABSTRACT

A signal which varies over time is monitored to determine an alarm condition, where the sample stream of digital values from an A/D converter is divided in to equal length pieces and a Fourier Transform (FT) algorithm is used to transform each piece of the stream into a three dimensional dataset including frequency domain amplitude, frequency and time. A Frequency Envelope is calculated by taking the maxima over the time dimension for a period of time, leaving a two dimensional frequency domain amplitude vs frequency dataset which is compared with new data arriving to determine the alarm condition for each element of the Frequency Envelope either by applying a constant delta additively or multiplicatively or by using a "leaky bucket" algorithm.

7 Claims, 2 Drawing Sheets

FREQUENCY ENVELOPE DETECTION METHOD FOR SIGNAL ANALYSIS

This application claims the benefit of the priority date under 35USC119 from Provisional Application 60/704,914 filed 3 Aug. 2005.

The present invention relates to signal detection algorithms as used in, but not limited to, physical fiber optic intrusion detection systems.

BACKGROUND OF THE INVENTION

In the following patent applications all filed Jun. 15, 2005 of the present applicant are disclosed and claimed techniques for monitoring single mode fibers for intrusion:

Application Ser. No. 11/152,679 entitled AN INTRUSION DETECTION SYSTEM FOR USE ON SINGLE MODE OPTICAL FIBER USING FRESNEL REFLECTIONS.

Application Ser. No. 11/152,772 entitled AN INTRUSION DETECTION SYSTEM FOR USE ON SINGLE MODE OPTICAL FIBER USING A STORAGE REGISTER FOR DATA.

Application Ser. No. 11/152,680 entitled AN INTRUSION DETECTION SYSTEM FOR USE ON SINGLE MODE OPTICAL FIBER USING A SIMPLIFIED POLARIMETER.

Application Ser. No. 11/152,663 entitled AN INTRUSION DETECTION SYSTEM FOR USE ON SINGLE MODE OPTICAL FIBER USING A COST REDUCED POLARIMETER.

Application Ser. No. 11/152,681 entitled AN INTRUSION DETECTION SYSTEM FOR USE ON SINGLE MODE OPTICAL FIBER USING A POLARIMETER.

In the following patent applications both filed May 26, 2005 of the present applicant are disclosed and claimed techniques for monitoring multi-mode fibers for intrusion:

Application Ser. No. 11/137,776 entitled AN INTRUSION DETECTION SYSTEM FOR USE ON AN OPTICAL FIBER USING A TRANSLATOR OF TRANSMITTED DATA FOR OPTIMUM MONITORING CONDITIONS.

Application Ser. No. 11/137,777 entitled AN INTRUSION DETECTION SYSTEM FOR USE ON MULTI-MODE OPTICAL FIBER USING AN OFFSET LAUNCH AND TAP COUPLER.

The disclosures of all of the above applications are incorporated herein by reference.

Often in data collection and analysis, for example of the type disclosed above, there arises a need to reject ambient signals in the interest of increasing functional sensitivity to the signals being detected. In the physical layer fiber optic intrusion detection systems described above, a system must detect motion in a fiber representative of an intrusion attempt, while ignoring such signals as air currents and vibrations. Simple threshold detection can otherwise be overwhelmed by the ambient.

Ambient signals are often periodic in nature, partly due to the resonant frequency of the system being monitored, fundamental to both the material and installation. For example, a fiber strung over an air duct will resonate at a repeatable frequency. A fiber in a conduit adjacent to an elevator will also have a unique frequency, while an intrusion into a fiber will often be less periodic. It is useful to desensitize the system from the ambient, while maintaining sensitivity to non-learned conditions.

SUMMARY OF THE INVENTION

It is one object of the present invention to provide an algorithm for use in monitoring a signal which varies over time to determine an alarm condition that enhance sensitivity by rejecting ambient signatures.

According to a first aspect of the invention there is provided a method of monitoring a signal which varies over time to determine an alarm condition, the method comprising:

providing the signal as a stream of digital values;

dividing the sample stream in to equal length pieces each containing a series of the values;

using a Fourier Transform (FT) algorithm to transform each piece of the stream into a three dimensional dataset including frequency domain amplitude, frequency and time;

calculating a Frequency Envelope by taking the maxima over the time dimension for a period of time, leaving a two dimensional frequency domain amplitude vs frequency dataset;

applying a constant delta additively or multiplicatively to each frequency amplitude element of the Frequency Envelope to adjust sensitivity thereof to provide a threshold;

comparing at least some of the frequency amplitude elements of the stream with the threshold and triggering the alarm condition in the event that the threshold is exceeded in any frequency amplitude element of the stream.

In one particular example of use of this method the signal is extracted from an optical fiber in response to the injection into the fiber of a signal from a source using one or more of the techniques disclosed in the above applications and the alarm condition is detection of movement in the fiber indicative of an intrusion event.

Preferably the Frequency Envelope is re-calculated periodically at predetermined times dependant upon the ambient conditions.

According to a second aspect of the invention there is provided a method of monitoring a signal which varies over time to determine an alarm condition, the method comprising:

providing the signal as a stream of digital values;

dividing the sample stream in to equal length pieces each containing a series of the values;

using a Fourier Transform (FT) algorithm to transform each piece of the stream into a three dimensional dataset including frequency domain amplitude, frequency and time;

calculating a Frequency Envelope by taking the maxima over the time dimension for a period of time, leaving a two dimensional frequency domain amplitude vs frequency dataset;

the Frequency Envelope having a series of frequency amplitude elements;

employing a "leaky bucket" algorithm for each frequency domain amplitude element wherein the value of each amplitude element is added to a virtual "bucket" at each time step and wherein simultaneously each virtual "bucket" drains at a constant rate;

and when a virtual "bucket" reaches a predetermined threshold, triggering the alarm condition.

In its simplest form, the invention samples data from an A/D converter which is monitoring the signal to be analyzed. The sample stream is divided in to equal length pieces, and then transformed with a Fourier Transform (FT) algorithm. This creates a three dimensional dataset consisting of frequency domain amplitude, frequency, and time. The Frequency Envelope is calculated by taking the maxima over the time dimension, leaving a 2 dimensional frequency domain amplitude vs frequency dataset. Additionally, a constant delta is additively or multiplicatively applied to each frequency amplitude element to adjust intrusion sensitivity. That is, the delta or difference value is either simply added to the envelope, to define the threshold value to be exceeded by the next amplitude element value calculated by the algorithm, or the delta can be applied by a multiplication factor applied to the value of the element.

To monitor for intrusions, the sample stream is divided into equal length pieces, transformed with a Fourier Transform, and then compared to the Frequency Envelope. If any frequency domain amplitude element in the transformed monitoring piece exceeds its counterpart in the Frequency Envelope, an intrusion is detected.

Processing for both Frequency Envelope calculation and monitoring may involve the use of one or more of the following additional known algorithms which are windowing functions, overlapping data pieces and filtering, all of which are well known to a person skilled in this art.

Also, the Frequency Envelope-monitoring piece comparison may compare all of the available frequency domain amplitude elements or only a subset thereof.

DETAILED DESCRIPTION

Figure 1:
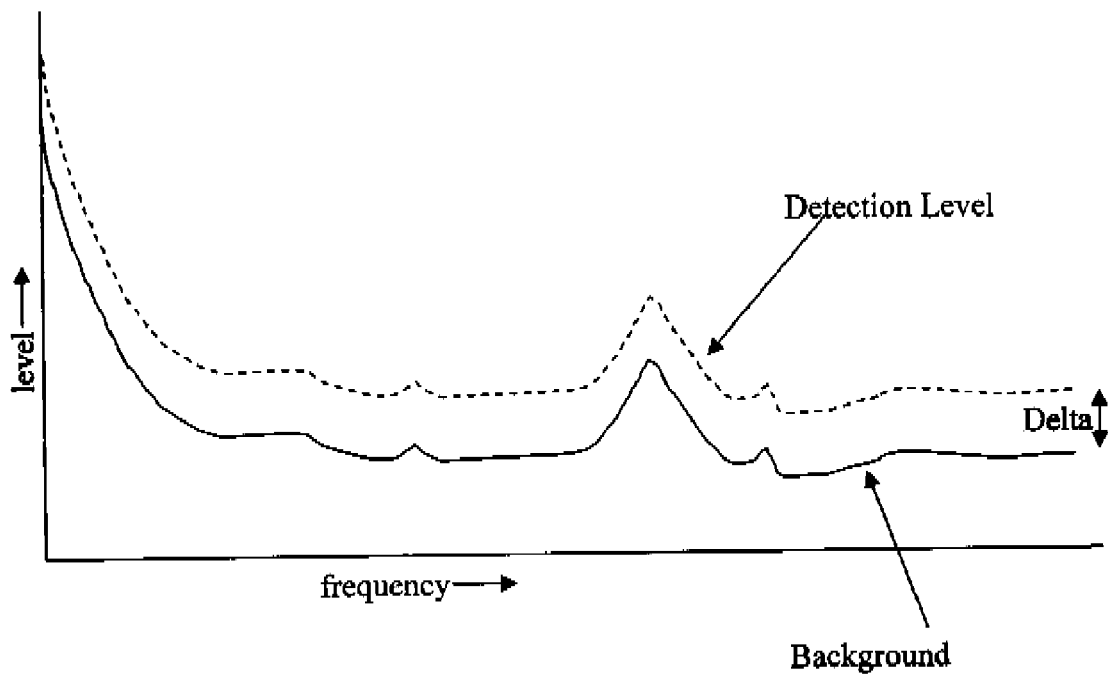
FIG. 1 is a graph of the Frequency envelope obtained as part of the method of the present invention where a predetermined constant delta is added to the averaged frequency envelope to provide a threshold value to compare with new data in the incoming stream.
Figure 2:
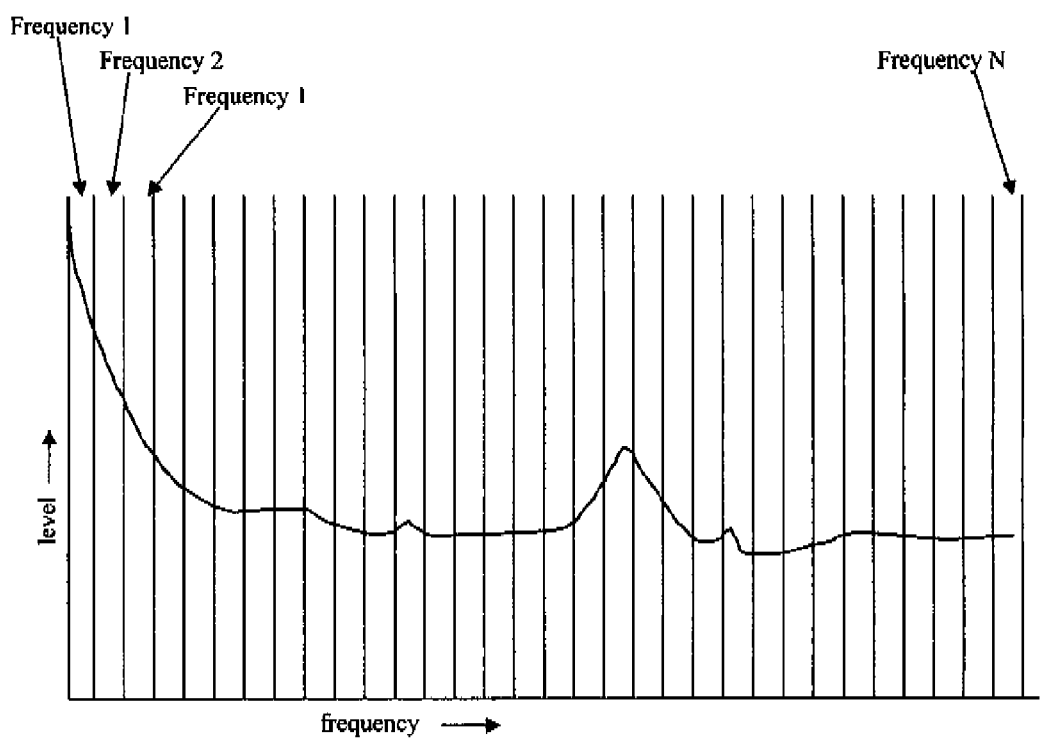
FIG. 2 is a schematic illustration using the graph of FIG. 1 where the new data in the incoming stream is used to determine new amplitude values for each of the frequency elements.

In FIG. 1 is shown a graph of the Frequency Envelope in which the method of the invention samples data from an A/D converter which is monitoring the signal to be analyzed. The sample stream is divided in to equal length pieces, and then transformed with a Fourier Transform (FT) algorithm. This creates a three dimensional dataset consisting of frequency domain amplitude, frequency, and time. The Frequency Envelope shown in FIG. 1 is calculated by taking the maxima over the time dimension, leaving a two dimensional frequency domain amplitude vs frequency dataset as shown. Additionally, a constant delta is additively or multiplicatively applied to each frequency amplitude element to adjust intrusion sensitivity. That is, the delta or difference value is either simply added to the envelope, to define the threshold value or detection level to be exceeded by the next amplitude element value calculated by the algorithm, or the delta or difference value can be applied by a multiplication factor applied to the value of the element.

Figure 3:
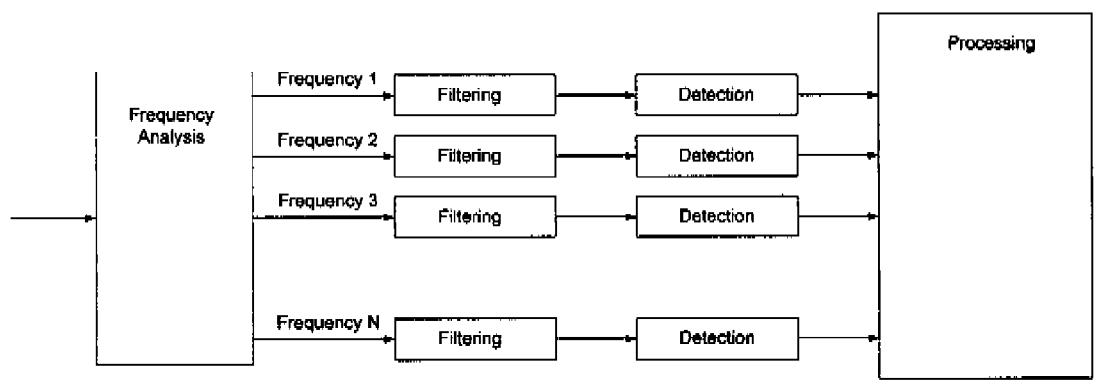
FIG. 3 is a schematic illustration using the graph of FIG. 1 where the new data in the incoming stream is used to calculate new amplitude values for each of the frequency elements which are compared with the threshold value for those elements by utilizing filtering such as, but not limited to, the "leaky bucket" algorithm.

In FIG. 3 is shown an alternative detection method which employs a "leaky bucket" for each frequency domain amplitude element. The value of each amplitude element is added to a virtual "bucket" at each time step. Simultaneously, each bucket drains at a constant rate. When a bucket reaches some predetermined threshold, an intrusion is detected. The drain rate and threshold of each bucket is configured such that normal environmental perturbations of the fiber will not trigger an intrusion detection. This method is good at rejecting momentary broadband noise on the fiber.

The bucket fills at a rate determined by the characteristics of the noise: large amplitude or long time duration noise will fill the bucket more quickly, making the system sensitive to both large perturbations and sustained ones.

If one were to visualize the Fourier Transform display as a discrete function rather than continuous, each vertical cell could be analyzed using the leaky bucket technique. This combines the frequency dependant ambient rejection with the false alarm rejection of the leaky bucket.

After installation, or periodically thereafter, the system can be put into an "auto-configure" mode, where the response curve of the FED is developed dependant upon the ambient conditions. Since many environments are staffed and utilized by shifts, one could store periodic auto-configured FT reference plots. For example, a typical office may be busy from 9-5, the cleaners vacuum from 5-6, then the HVAC is turned down for the night and the room changes temperature. At 7 AM the freight elevators may be busy. 2 AM may be silent. If the FED system learned the environment as a function of time of day, and day of the week or year, an increase in sensitivity to intrusions would occur.

The invention claimed is:

1. A method of monitoring a signal which varies over time to determine an alarm condition, the method comprising:
    providing the signal as a stream of digital values;
    dividing the sample stream in to equal length pieces each containing a series of the values;
    using a microprocessor to apply a Fourier Transform (FT) algorithm to transform each piece of the stream into a three dimensional dataset including frequency domain amplitude, frequency and time;
    calculating a Frequency Envelope by taking the maxima over the time dimension for a period of time, leaving a two dimensional frequency domain amplitude vs frequency dataset;
    applying a constant delta additively or multiplicatively to each frequency amplitude element of the Frequency Envelope to adjust sensitivity thereof to provide a threshold;
    comparing a plurality of the frequency amplitude elements of the stream with the threshold and triggering the alarm condition in the event that the threshold is exceeded in any frequency amplitude element of the stream.

2. The method according to claim 1 wherein the signal is extracted from an optical fiber in response to the injection into the fiber of a signal from a source and wherein the alarm condition is detection of movement in the fiber indicative of an intrusion event.

3. The method according to claim 1 wherein the Frequency Envelope is re-calculated periodically at predetermined times dependant upon the ambient conditions.

4. The method according to claim 1 wherein the algorithm includes windowing functions.

5. The method according to claim 1 wherein the algorithm includes overlapping data pieces.

6. The method according to claim 1 wherein the algorithm includes filtering.

7. The method according to claim 1 wherein the Frequency Envelope-monitoring piece comparison compares only a subset of the available frequency domain amplitude elements.

* * * * *